United States Patent [19]

Enomoto et al.

[11] 3,776,048
[45] Dec. 4, 1973

[54] AUTOMATIC POWER TRANSMISSION CONTROL SYSTEM

[75] Inventors: Koji Enomoto; Takayuki Akaishi; Wataru Ishimaru, all of Yokohama, Japan

[73] Assignee: Nissan Motor Company, Limited, Yokohama, Japan

[22] Filed: Sept. 3, 1971

[21] Appl. No.: 177,603

[30] Foreign Application Priority Data
Feb. 8, 1971 Japan............................46/4730

[52] U.S. Cl. .................................................. 74/866
[51] Int. Cl. ............................................ B60k 21/02
[58] Field of Search ............................... 74/866, 877

[56] References Cited
UNITED STATES PATENTS

| | | | |
|---|---|---|---|
| 2,399,567 | 4/1946 | Peterson et al. | 74/866 X |
| 2,557,791 | 6/1951 | Long | 74/877 X |
| 2,620,667 | 12/1952 | Flinn | 74/877 X |
| 2,909,077 | 10/1959 | Kamins | 74/866 |
| 3,088,337 | 5/1963 | Bemmann | 74/866 X |
| 3,646,835 | 3/1972 | Ito et al. | 74/866 X |
| 3,673,892 | 7/1972 | Kato et al. | 74/866 X |
| 3,680,411 | 8/1972 | Ito et al. | 74/866 |

Primary Examiner—Charles J. Myhre
Assistant Examiner—Thomas C. Perry
Attorney—Donal E. McCarthy et al.

[57] ABSTRACT

An automatic power transmission control system for a vehicle driven by an engine having a carburetor throttle valve which control system comprises a shift control unit to cause shifting of different gear reduction ratios in accordance with a signal representative of an effective opening area of the throttle valve and a signal representative of a vehicle speed, and a shift pattern generator circuit associated with the shift control unit and responsive to a signal representing a closed condition of the throttle valve for modifying the shift pattern whereby a downshift is effected from a lower gear reduction ratio to a higher gear reduction ratio regardless of the vehicle speed to provide sufficient engine braking action when the closed condition of the throttle valve is sensed.

3 Claims, 11 Drawing Figures

AUTOMATIC POWER TRANSMISSION CONTROL SYSTEM

This invention relates to an automatic power transmission providing a plurality of gear reduction ratios and, more particularly, to a control system of such power transmission.

An automatic power transmission of the planetary gear set type used in a motor vehicle commonly includes a control system for controlling the actuation of friction elements, such as friction clutches and brakes, which are selectively engaged and disengaged in sequence to automatically effect successive shifts from one driving speed range gear reduction ratio to another. The shift patterns for such automatic shifts are so arranged that the shift will automatically take place when the output shaft speed of the transmission exceeds a certain value. A problem is encountered with such shift patterns in that it is impossible to automatically effect engine braking action when driving on very winding roads, or, for example, turning sharply such as on mountainous and meandering roads. Thus, it is frequently necessary to apply undesirably a service brake or to manually cause the transmission to shift to its low speed lock-up position when going downhill or driving on meandering roads with a result that it is difficult to attain the basic purpose of automatic control, that is, to reduce driver's effort in vehicle operation.

It is, therefore, an object of this invention to provide an improved control system for an automatic power transmission providing a plurality of gear reduction ratios.

Another object of this invention is to provide a control system adapted for automatically effecting an engine braking action when going downhill or when driving on winding roads.

Another object of this invention is to provide a control system adapted for automatically effecting downshift from the higher speed range gear reduction ratio to the lower speed range gear reduction ratio, that is, from a low input-output ratio to a high input-output ratio, thereby to provide sufficient engine braking action when going downhill.

Another object of this invention is to provide a control system for effecting downshift when closing an engine carburetor throttle valve while driving at a moderate vehicle speed.

In order to achieve these and other objects, the present invention contemplates to provide an additional switching means and an associated circuitry in an electronic control circuit forming a part of a known control system. This switching means is made responsive to a closed condition of a carburetor throttle valve of the engine when going downhill or when driving on winding roads to generate an electric signal. The electric signal thus generated is utilized for changing a shifting signal generated by the electronic control circuit whereby downshift will be automatically effected from a low gear reduction ratio to a high gear reduction ratio to provide sufficient engine braking action when going downhill.

The control system of the present invention will be herein shown and described as applied to an automatic power transmission providing three forward drive gear reduction ratios and a reverse drive gear reduction ratio and having a hydrodynamic torque converter by way of example only. It should, however, be understood that the control system of this invention is also applicable to a great veriety of automatic power transmissions providing two or more than three forward drive gear reduction ratios. It should be understood that expressions such a "upward," "leftward," "downward" etc. used in the following description of the drawings may or may not refer to such directional movements, actions or positions in actuality and are applicable to the drawings only.

Figure 1:
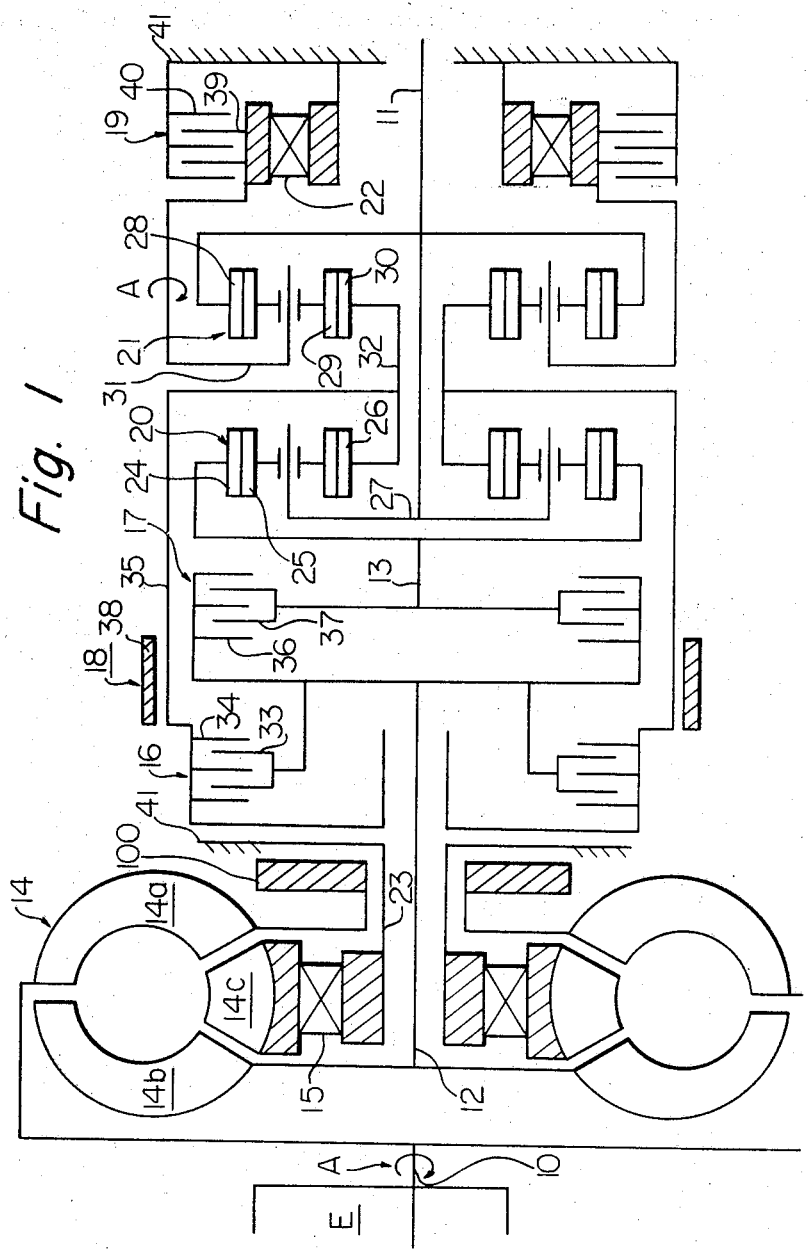
FIG. 1 is a schematic diagram of an automatic power transmission to which the control system according to this invention is applied.

Referring now to FIG. 1, the automatic power transmission to which this invention is applied comprises a drive shaft 10 and a driven shaft 11. The drive shaft 10 is connected to a suitable prime mover such as an internal combustion engine E, and the driven shaft 11 is connected to driving wheels (not shown) of the motor vehicle. The transmission herein shown also comprises a turbine shaft 12 and an intermediate shaft 13 which are in line with the shafts 10 and 11. The transmission also comprises a hydrodynamic torque converter 14 with a oneway brake 15, first and second hydraulically operated friction clutches 16 and 17, first and second hydraulically operated friction brakes 18 and 19, first and second planetary gear sets 20 and 21, and a one-way brake 22.

The hydrodynamic torque converter 14 comprises, as customary, a bladed impeller or pump 14a, a bladed rotor or turbine 14b, and a bladed reaction element or stator 14c, The impeller 14a is driven from the drive shaft 10, and the rotor 14b is fixed to the turbine shaft 12. The stator 14c is rotatably mounted on a mechanism comprising a hollow shaft 23 and the one-way brake 15 which is disposed between the stator 14c and the hollow shaft 23.

The one-way brake 15 may be of any suitable construction and is so arranged as to allow a free rotation of the stator 14c only in the forward direction of the vehicle, that is, in the direction in which the drive shaft 10 rotates but not in the reverse direction.

The torque converter 14 operates in a manner well known for driving the turbine 14b at a greater torque than engine torque impressed on the impeller 14a of the converter. The stator 14c functions to change the direction of flow of the fluid from the turbine 14b to the impeller 14a in a positive direction so as to transfer this increased torque to the turbine 14b. The stator 14c tends to rotate in the same direction as the direction in which the turbine 14b and the impeller 14a rotate when certain speeds are reached by the last two elements, whereupon the torque converter 14 now operates essentially as a fluid coupling in which the turbine 14b is driven at a substantially constant speed at a given engine speed and without increase in torque with respect to the impeller 14a.

The first planetary gear set 20 has rotary members including an internally toothed outer ring gear 24 which is connected to the intermediate shaft 13, two or more planet pinions 25 which externally mesh with the outer ring gear 24, and a sun gear 26 externally meshing with the planet pinions 25. The planet pinions 25 are carried by a pinion carrier 27 which is connected with the driven shaft 11.

The second planetary gear set 21, similarly, has rotary members including an internally toothed outer ring gear 28, two or more planent pinions 29 externally meshing with the ring gear 28, and a sun gear 30 externally meshing with the planet pinions 29. The planet pinions 29 are carried by a pinion carrier 31, which is shown as connected with a rotor of the one-way brake 22.

The rotary members (except the pinions) thus arranged are rotatable concentrically about a common axis which is in line with the driven shaft 11 connected to the pinion carrier 27 of the first planetary gear set 20. As illustrated by way of example, the sun gears 26 and 30 of the first and second planetary gear sets 20 and 21, respectively, are integrally mounted on a hollow shaft 32 which is rotatable about the driven shaft 11.

The first friction clutch 16 or front clutch may be of any suitable construction and in the illustrated preferred embodiment comprises a drive portion 33 connected to the turbine shaft 12, and a driven portion 34 connected to a brake drum 35 which is integral with the hollow shaft 32. The clutch 16 is actuated by an actuator (not shown), which will be discussed hereinafter, for effecting engagement and disengagement of the drive portion 33 to and from the driven portion 34 when a hydraulic pressure is applied and relieved, respectively.

The second friction clutch 17 or rear clutch similarly comprises a drive portion 36 connected to the turbine shaft 12 and a driven portion 37 connected to the intermediate shaft 13. The rear clutch 17 is actuated by an actuator (not shown) for engaging and disengaging the drive portion 36 to and from the driven portion 37.

The first friction brake 18 or band brake is shown to comprise a brake band 38 adapted to act on the brake drum 35. The first brake 18 is actuated by an actuator (not shown) associated therewith for actuating and releasing the same to brake or release the sun gears 26 and 30 through the hollow shaft 32 connected thereto.

The second friction brake 19 or low and reverse brake comprises a rotor portion 39 which is connected to the pinion carrier 31 associated with the one-way brake 22, and a stator portion 40 connected to a transmission housing 41. The low and reverse brake 19 is actuated by an actuator (not shown).

The one-way brake 22 may be constructed in any suitable fashion to allow a free rotation of the pinion carrier 31, connected with the rotor 39 of the low and reverse brake 19, only in the direction shown by arrow A. The power transmission thus constructed operates in a manner well known to provide three automatically selected forward drive gear ratios, a single manually selected forward drive gear reduction ratio and a single reverse drive gear reduction ratio, through selective coupling of the clutches and brakes.

The operating conditions of the clutches and brakes for the different drives and the respective gear rations are tubulated in Table I, wherein the sign "+" denotes that the related clutch or brake is actuated and the sign "—" denotes that the clutch or brake is kept released.

TABLE I

| | Selected drive range | Gear ratio (example) | First clutch 16 | Second clutch 17 | First brake 18 | Second brake 19 | One-way brake 22 |
|---|---|---|---|---|---|---|---|
| D₁ | First range. | 2.45 | — | + | — | — | + |
| D₂ | Second range | 1.45 | — | + | + | — | — |
| D₃ | Third range | 1.00 | + | + | — | — | — |
| L | First range. | 2.45 | — | + | — | + | — |
| R | Reverse | 2.18 | + | — | — | + | — |

As seen in Table I, first speed range gear ratio in the automatic drive is established by engaging the second clutch 17 and the one-way brake 22. With the one-way brake 22 actuated, the drive connection is interrupted between the engine and the driving wheels of the motor vehicle when the power flow is reversed because of the overrunning nature of brake 22 so that engine braking does not take place. The second speed range gear ratio is established when the first brake 18 is applied with the second clutch 17 kept engaged. When the first brake 18 is applied with the second clutch 17 kept engaged. When the first brake 18 is applied, the drive connection maintained between the engine and the driving wheels of the vehicle even when the power flow is reversed so that engine braking action is brought about. The third speed range gear ratio is established by engaging the first clutch 16 with the second clutch 17 kept engaged. When the first clutch 16 is engaged, the engine braking action is brought about in the same manner as in the second speed range gear ratio. The first range gear ratio in the "L" position is established by engaging the second clutch 17 and the second brake 19. With the second brake 19 actuated, the drive connection is maintained between the engine and the driving wheels of the motor vehicle even when the power flow is reversed so that engine braking is brought about. The reverse drive is completed by engaging the first clutch 16 and the second brake 19. When the second brake 19 is actuated, engine braking action is brought about in the manner discussed above.

Figure 2:
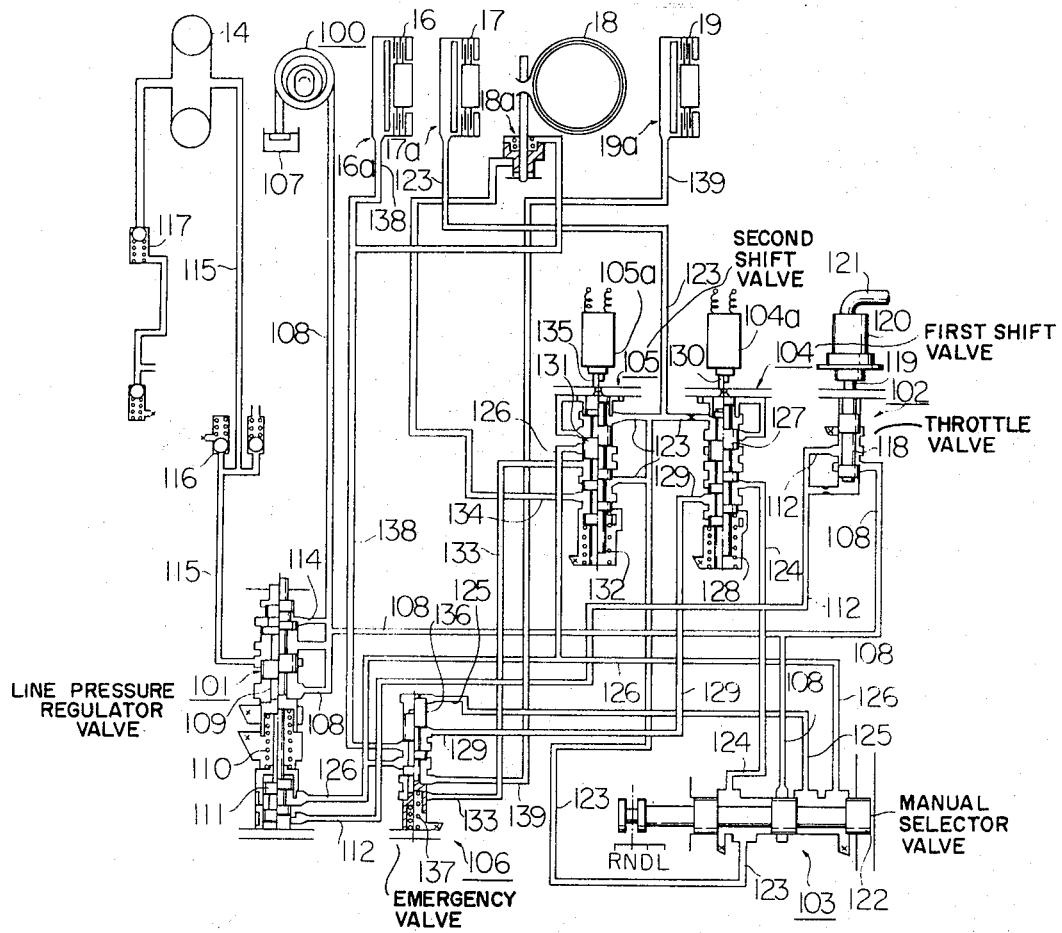
FIG. 2 is a schematic diagram of a hydraulic control circuit forming a part of the control system according to this invention.

Referring to FIG. 2, a hydraulic control circuit is shown which controls the actuation of the friction elements thereby to selectively effect shafts of the different speed range gear ratios. The hydraulic control circuit is shown to include a fluid pump 100, a line pressure regulator valve 101, a throttle valve 102, a manual selector valve 103, a first shift valve 104, a second shift valve 105 and an emergency valve 106.

The fluid pump 100 and a sump 107 serve as a source for supplying fluid under pressure to the actuators of the friction elements, the torque converter and parts of the transmission to be lubricated. The fluid pump 100 is adapted to be driven from the drive shaft 10 through the bladed impeller 14a of the torque converter 14. During the operation of the engine E, the fluid pump 100 functions to suck up fluid from the fluid sump 107 and deliver it to a conduit 108. The fluid pressure in this conduit 108 is herein referred to as a line pressure. The line pressure in the conduit 108 is adjusted to a desired level by means of the line pressure regulator valve 101 for effecting smooth engagement of the friction elements.

The line pressure regulator valve 101 comprises a valve spool 109 and a spring 110. The valve spool 109 is urged by the force of the spring 10 upward. Another valve spool 111 is co-acting with the valve spool 109 for thereby regulating the line pressure. The throttle pressure in a conduit 112 and the line pressure in a conduit 126 act through the valve spool 111 on the valve spool 109 and act against the pressure applied on the upper part of the valve spool 109 from the conduit 108 through an orifice 114.

The pressurized fluid for operating the hydrodynamic torque converter 14 is fed from the conduit 108 through the line pressure regulator valve 101 to a conduit 115 and maintained at a proper level by the aid of relief valves 116 and 117. The fluid fed through the relief valve 117 is then delivered through a fluid cooling device, not shown, to the component parts of the power transmission to be lubricated.

The throttle valve 102 comprises a valve spool 118 and is connected through a plunger 119 to a vacuum diaphragm (not shown) in a diaphragm housing 120 which is connected through a conduit 121 to an intake manifold (not shown) of the engine. The inlet of the throttle valve 102 communicates with the main conduit 108 to cause the modulated throttle pressure to be delivered to the regulator valve 101. The modulated throttle pressure is utilized for regulating the line pressure in the main conduit 108 to an optimum level for effecting smooth engagement of the friction elements. The fluid under pressure thus regulated is passed through the main conduit 108 to the manual selector valve 103.

The manual selector valve 103 is shown to have the following positions: an "R" or reverse drive position, an "N" or neutral position, a "D" or automatically controlled forward drive position, and an "L" or manually controlled forward low speed drive position. The manual selector valve 103 comprises a valve spool 122 which at each selected position serves to deliver the pressurized fluid introduced from the main conduit 108 into any required conduit of conduits 123, 124, 125 and 126. The pressurized fluid in the conduit 108 is delivered to the conduits 123, 124, 125 and 126 in response to a selected position of the valve spool 122 as shown in the following Table II.

TABLE II

| | Conduit 123 | Conduit 124 | Conduit 125 | Conduit 126 |
|---|---|---|---|---|
| R position | − | − | + | + |
| N position | − | − | − | − |
| D position | + | + | − | − |
| L position | + | − | + | − |

In Table II, the sign "+" means that the fluid under line pressure is introduced into the respective conduits at each selected position and the sign "−" means that the pressurized fluid is prevented from being delivered to the respective conduits.

The first and second shift valves 104 and 105 cooperate with each other for controlling the fluid flow to the friction elements thereby to effect a shift of the different speed range gear reduction ratios.

The first shift valve 104 comprises a valve spool 127 and a spring 128. The spring 128 urges the valve spool 127 upward. The inlet of the shift valve 104 communicates with the conduit 124 leading from the manual selector valve 103 and the outlet with a conduit 129 leading to the emergency valve 106. The valve spool 127 is subjected at its upper part to the pressure applied thereon for acting against the force of the spring 128. On the upper end of the valve spool 127 a plunger 130 of a first solenoid 104a is mounted. The first solenoid 104a, which may be of any suitable construction, controls the movement of the valve spool 127 which in turn controls the flow of pressurized fluid through valve 104.

The second shift valve 105 comprises a valve spool 131 and a spring 132. The spring 132 urges the valve spool 131 upward. The inlet of the shift valve 105 communicates with the conduit 123 and the outlets with conduits 133 and 134. The conduit 133 communicates with the emergency valve 106 while the conduit 134 communicates with the actuator 18a of the first brake 18. The shift valve 105 communicates also with the conduit 126, with which the conduit 133 may communicate. On the upper end of the valve spool 131 a plunger 135 of a second solenoid 105a is mounted. The second solenoid 105a, which may be of any known suitable construction, controls the sliding of the spool 131 which in turn controls the flow of pressurized fluid through valve 105.

The emergency valve 106 comprises a valve spool 136 and a spring 137 and communicates at its upper part with the conduit 125 leading from the manual selector valve 103. The emergency valve 106 also communicates with the conduit 129, with which a conduit 138 may communicate. The conduit 138 communicates with the actuator 16a of the first clutch 16 and the release side of the actuator 18a of the first brake 18. The conduit 138 may also communicates with the conduit 126. The emergency valve 106 further communicates with the conduit 133, with which a conduit 139 also may communicates. The conduit 139 communicates with the actuator 19a of the second brake 19.

The solenoids 104a and 105a for the first and second shift valves 104 and 105 respectively, are operated by an electronic control circuit as will be discussed later according to the schedule set forth in the following Table III wherein a sign "+" denotes a condition in which the solenoid is energized and a sign "−" denotes a condition in which the solenoid is de-energized.

TABLE III

| Selected Position | Speed Range | 1st Solenoid | 2nd Solenoid |
| --- | --- | --- | --- |
| R | Reverse | − | − |
| N |  | − | − |
| D | 1st | + | + |
| D | 2nd | + | − |
| D | 3rd | − | − |
| L | 1st | − | + |
| L | 2nd | − | − |

When the manual selector valve 103 is moved to the "R" position, the conduits 125 and 126 communicate with the main conduit 108 as seen from Table II. Pressurized fluid from the main conduit 108 is delivered through the conduit 125 to the upper part of the emergency valve 106, so that the valve spool 136 is moved downward thereby establishing communications between the conduits 126 and 138 and between the conduits 133 and 139. The pressurized fluid delivered to the conduit 126 is then passed through the conduit 138 over to the actuator 16a of the first clutch 16 and to the release side of the actuator 18a of the first brake 18. The pressurized fluid in the conduit 126 is also delivered to the second shift valve 105. Since, in this condition, the second solenoid 15a is de-energized as shown in Table III, the valve spool 131 of the second shift valve 105 is moved upward by the action of the spring 132 thereby establishing communication between the conduits 126 and 133. Consequently, the pressurized fluid in the conduit 126 is passed through the conduits 133 and 139 over to the actuator 19a of the second brake 19. Thus, the first clutch 16 and the second brake 19 are engaged so that the reverse drive ratio is established.

When the manual selector valve spool 122 is moved to the "N" position, the conduits 123, 124, 125 and 126 do not communicate with the main conduit 108 as seen from Table II. In this condition no friction elements are engaged so that a neutral condition established.

When the manual selector valve spool 122 is moved to the "D" position, the main conduit 108 communicates with the conduits 123 and 124 thereby admitting pressurized fluid thereto. The pressurizied fluid admitted to the conduit 123 is passed directly to the actuator 17a of the second clutch 17, which is consequently engaged at all times for all forward speed ranges. Pressurized fluid in the conduit 123 is also delivered to the upper parts of the first and second shift valves 104 and 105. The pressurized fluid admitted to the conduit 124 is further delivered to the first shift valve 104 at an intermediate portion of valve 104.

Since the electronic control circuit operates to energize and de-energize the first and second solenoids 104a and 105a, respectively, in a manner prescribed in Table III, the forward driving speed range gear ratios are effected by electric signals delivered to the solenoids 104a and 105a.

When the selector valve is in "D" position and the first speed range electric signal is generated by the electronic control circuit, both the first and second solenoids 104a and 105a are energized so that the plungers 130 and 135 are caused to protrude. Consequently, the valve spools 127 and 131 are moved downward against the forces of the springs 128 and 132, respectively. In this condition, the communication between the conduits 124 and 129 is interrupted, while communication between the conduits 123 and 133 is established. The pressurized fluid admitted to the conduit 132 is accordingly delivered through the conduit 133 to the emergency valve 106. Since, in this condition, the valve spool 136 of the emergency valve 106 is moved upward by the force of the spring 137, the conduit 133 is closed by a land (not identified) of the valve spool 136 so that fluid in the conduit 139 is not pressurized. Thus, only the second clutch 17 is engaged and, therefore, the first speed range gear reduction ratio is obtained by the action of the one-way brake 22.

As the vehicle speed increases to the shifting point from the first speed range gear ratio to the second speed range gear ratio, then the second solenoid 105a is de-energized with the first solenoid 104a kept energized as seen from Table III, so that the valve spool 131 of the second shift valve 105 is moved upward by the force of the spring 132. Consequently, the conduit 123 communicates with the conduit 134, thereby admitting pressurized fluid to the apply side of the actuator 18a of the first brake 18. Since, in this condition, the pressure in the release side of the actuator 18a is released through an exhaust port (not identified) of the first shift valve 104 through the conduit 138, emergency valve 106, and conduit 129, the first brake 18 is engaged and thus the second speed range gear ratio is established, with the second clutch being directly engaged by the selector valve 103, and the one-way brake 22 being released. In this gear ratio engine braking action is effected when the power flow is reversed.

As the vehicle speed further increases, both solenoids 104a and 105a are de-energized, so that the valve spools 127 and 131 of the first and second shift valves are moved upward by the forces of the springs 128 and 132. The conduit 124 communicates with the conduit 129 thereby passing the pressurized fluid thereinto. Since the valve spool 136 of the emergency valve 106 is moved upward by the force of the spring 137, the conduit 129 communicates with the conduit 138 thereby pressurizing it. Pressurized fluid in the conduit 128 is delivered to the release side of the actuator 18a of the first brake 18 to cause the same to be disengaged. Pressurized fluid in the conduit 138 is also delivered to the actuator 16a of the first clutch 16. Thus, the first clutch 16 is engaged and the third speed gear ratio is obtained, the second clutch being already engaged.

When the manual selector valve spool 122 is moved to the "L" position, the main conduit 108 communicates with the conduits 123 and 125 thereby admitting pressurized fluid thereto. The pressurized fluid admitted to the conduit 123 is delivered to the actuator 17a of the second clutch 17 to cause the same to be engaged, while the pressurized fluid admitted to the conduit 125 is passed to the upper part of the emergency valve 106 to cause the valve spool 136 to move downward against the force of the spring 137. When, in this condition, the second speed range electric signal is generated by the electronic control circuit according to this invention, both the first solenoid 104a and the second solenoid 105a are de-energized so that the valve spools 127 and 131 are moved upward by the forces of the springs 128 and 132, respectively. In this condition, the conduit 123 communicates with the conduit 134 thereby admitting pressurized fluid to the apply side of the actuator 18a of the first brake 18. Thus, the second speed range gear ratio is obtained by engagement of clutch 17 and brake 18.

When, however, the first speed range electric signal is generated by the electronic control circuit, the second solenoid 105a is energized with the first solenoid 104a kept de-energized, so that the valve spool 131 is moved to a position in which the conduit 123 communicates with the conduit 133. Since the valve spool 136 of the emergency valve 106 is moved downwardly by the pressure in line 125 acting on the upper part of the valve spool 136 against the force of the spring 137, the conduit 133 communicates with the conduit 139. Consequently, the pressurized fluid admitted to the conduit 133 is delivered through the conduit 139 to the actuator 19a of the second brake 19. The second brake 19 is thus engaged and the second clutch 17 is already engaged directly by the selector valve 103, so that the first speed range gear ratio is established to effect engine braking action in the vent that the power flow is reversed.

The electronic control circuit as described hereinabove is schematically illustrated in block form in FIG. 3. As shown, the electronic control circuit comprises a throttle opening sensor 200, a vehicle speed sensor 201 and a shift control unit 202.

The throttle opening sensor 200 detects an effective open area of a throttle valve of a carburetor (not shown) of the engine E and is adapted to generate a voltage signal corresponding to the detected value. The vehicle speed sensor 201 detects the speed of the driven shaft 11 and is adapted to generate a voltage signal corresponding to the detected speed. The generated voltage signals are then delivered through lines 203 and 204 to first and second modifying circuits 205 and 206, respectively, where each of these voltage signals is modified into respective suitable forms for subsequent use. The voltage signals thus modified are then fed through lines 207 and 208 to a 1-2 gear reduction ratio comparator circuit 209 and a 2-3 gear reduction ratio comparator circuit 210, respectively. A line 207a connects line 207 to comparator circuit 210, and a line 208a connects line 208 to comparator circuit 209. These gear reduction ratio comparator circuits 209 and 210 compare the two voltage signals delivered from the first and second modifying circuits 205 and 206 thereby to generate control signals, respectively, for effecting a required shift of the different driving speed range gear reduction ratios. The control signal delivered from the 1-2 gear reduction ratio comparator circuit 209 is supplied through a line 211 to a first amplifier 212 while the control signal delivered from the 2-3 speed ratio comparator circuit 210 is fed through a line 213 to a second amplifier 214. The first and second amplifiers 212 and 214 amplify the control signals delivered from the gear reduction ratio comparator circuits 209 and 210 and supply the amplified control signals through lines 215 and 216 to the second and first solenoids 105a and 104a, respectively, for actuating them. These first and second solenoids 104a and 105a have two operating positions, which, as seen from Table III, are correlated with the operating positions of the associated shift valves of the hydraulic control circuit 217 to control the fluid flow to the actuators of the friction elements 218 thereby to selectively provide the three forward drive speed range gear reduction ratios and the single reverse drive gear reduction ratio.

Figure 4:
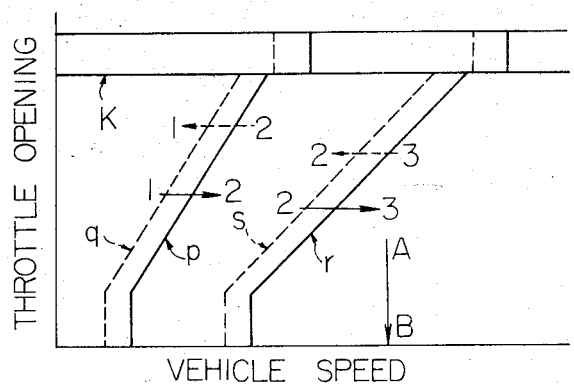
FIG. 4 is an example of conventional shift patterns.

The primary purpose of the electronic control circuit is to serve as a shift pattern generator for causing operation of the first and second solenoids 104a and 105a to effect the shifts. FIG. 4 illustrates a standard shift pattern which has heretofore been proposed in the prior art. In FIG. 4, the curve $p$ is formed of the shifting points at which the first speed range gear reduction ratio is shifted to the second speed range gear reduction ratio in dependence on throttle opening and vehicle speed and the curve $q$ is formed of the shifting points at which the second speed range gear reduction ratio is shifted to the first speed range gear reduction ratio, while the curve $r$ is formed of the shifting points at which the second speed range gear reduction ratio is shifted to the third speed range gear reduction ratio, and the curve $s$ is formed of the shifting points at which the third speed range gear reduction ratio is shifted to the second speed range gear reduction ratio. The points at which downshifts will automatically take place fall on line K when an accelerator pedal (not shown) is fully depressed. It will be seen, that since the transmission remains in the third speed range gear even when the accelerator pedal is released to decrease the effective throttle opening from a valve A to the closed position B when going downhill or during driving on very winding roads or for example, turning sharply such as on mountainous and meandering roads, it is impossible to effect sufficient engine braking action. Thus, it is necessary to apply undesirably the service foot brake or to effect downshifting by manually moving the selector lever to the "L" position in order to obtain engine braking action under emergency conditions.

Figure 5:
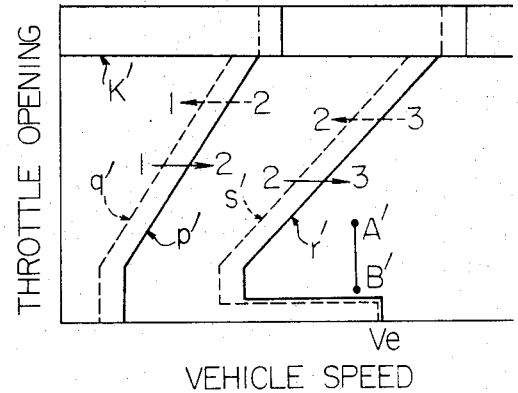
FIG. 5 is an example of shift patterns which are attained in accordance with the present invention.

In order to eliminate these drawbacks encountered in the prior art, the present invention proposes to control the pwer transmission in such a manner that the particular range is automatically selected within which the braking effect of the engine is best when going downhill or when driving on winding roads. An example of the shift pattern to attain this purpose is represented in FIG. 5, wherein like curves are designated by the like letters as used in FIG. 4 except that a prime (') has been added to those, respectively. As seen from FIG. 5, the curves $r'$ and $s'$ are varied to higher vehicle speed levels so that the shifts will take place at higher vehicle speed levels than seen in FIG. 4. However, if the accelerator pedal is released to decrease the effective throttle opening from the point $A'$, representing the third speed range gear ratio driving condition, to the point $B'$, then the downshift will be automatically effected from the third speed range gear ratio to the second speed range gear reduction ratio thereby to effect sufficient engine braking action even though the vehicle speed $V_e$ is still considerably higher than that at which downshifting would normally take place. It will be appreciated that although the shift pattern is shown as of the type to effect the downshift merely from the third to the second speed range gear ratio in FIG. 5, various modifications can be made so as to effect the downshift from the second to the first speed range gear reduction ratio, if desired.

Figure 3:
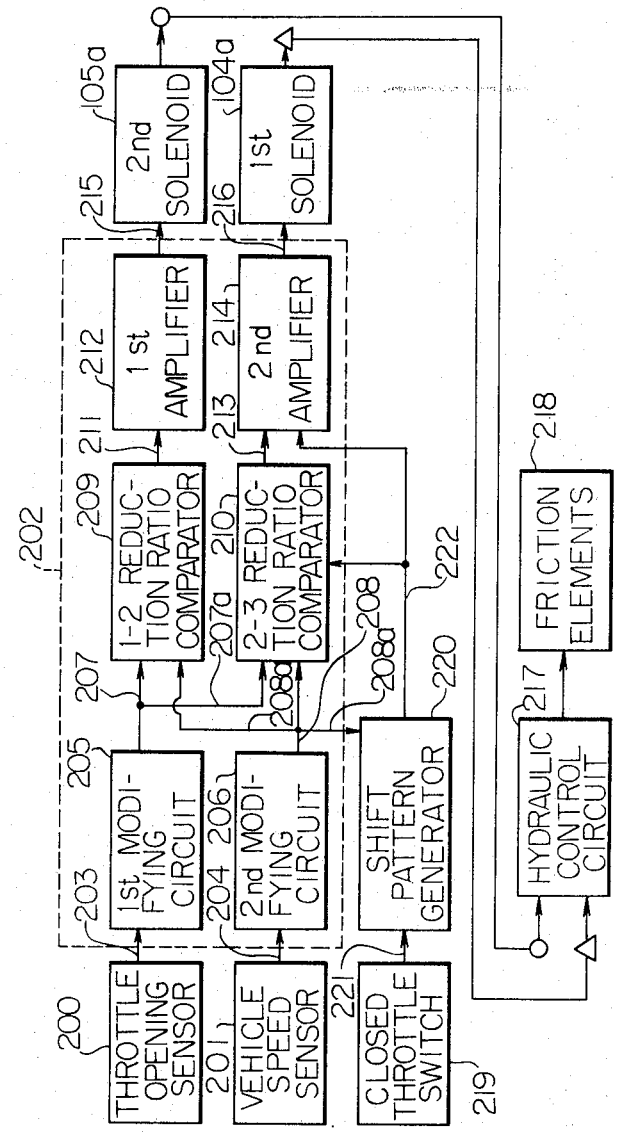
FIG. 3 is a block diagram illustrating an electronic control circuit forming a part of the control system according to this invention.

To automatically effect downshift from the higher vehicle speed gear reatio to the lower vehicle speed gear reduction ratio thereby to provide sufficient engine braking action when going downhill or when driving on winding roads, the electronic control circuit further includes a closed throttle switch 219 and a shift pattern generator 220, as shown in FIG. 3. The switch 219 senses and responds to a closed throttle condition of the throttle valve of the engine E by closing an electric circuit while driving and completely releasing an acceleration control member. An electric signal is thus developed and fed through a line 221 to the shift pattern generator 220, to which the voltage signal indicative of the vehicle speed is also delivered through the line 208a from the second modifying circuit 206. Upoin receiving these signals, the shift pattern generator 220 generates a shift pattern for producing a shifting signal which is transmitted through a line 222 to the amplifier 214. The shifting signal delivered to the amplifier 214 is then delivered through the line 216 to the first solenoid 104a for actuating the same thereby to effect downshift from the third to the second speed range gear reduction ratio when the throttle valve is substantially closed while driving.

Figure 6:
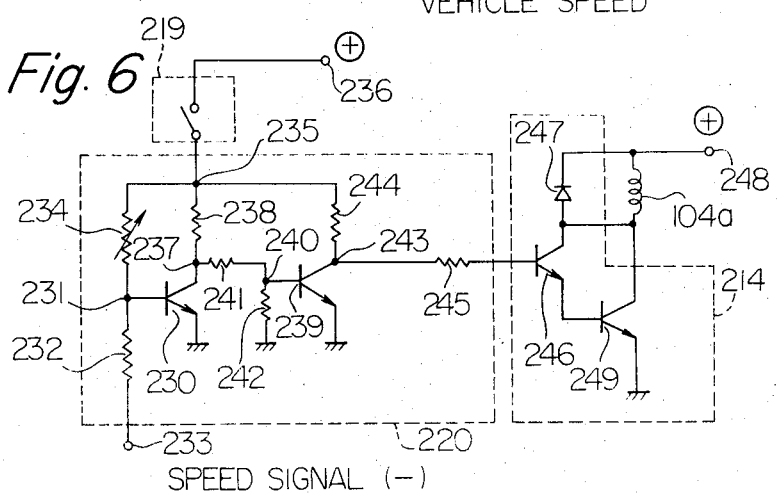
FIG. 6 is a diagram of an electric circuitry causing downshifting to take place when an engine carburetor throttle valve is closed while driving at a moderate vehicle speed.

Referring next to FIG. 6, there is schematically shown an example of the shift pattern generator 220 and the amplifier 214 associated therewith forming a part of the electronic control circuit according to the present invention. As shown, the shift pattern generator 220 includes two transistors and a plurality of resistor elements. The first transistor, designated at 230, is connected at its base to a junction 231 between a resistor 232 connected to a terminal 233 and an adjustable resistor 234 connected to a junction 235. The terminal 233 is connected to the vehicle speed sensor 201 through the modifying circuit 206 (see FIG. 3) and receives the voltage signal indicative of the vehicle speed. The junction 235 is connected to the closed throttle switch 219, which in turn is connectable to a positive terminal 236 of a d.c. electric power source (not shown). The collector of the transmistor 230 is connected through a junction 237 to a resistor 238 connected to the junction 235, and the emitter thereof is grounded. The second transistor, designated at 239, is connected at its base to a junction 240 between resistors 241 and 242. The resistor 241 is connected to the junction 237 while the resistor 242 is grounded. The collector of the transistor 239 is connected to a junction 243 between resistors 244 and 245, and the emitter thereof is grounded. The resistor 244 is connected to the junction 235, while the resistor 245 is connected to the base of a transistor 246 of the amplifier 214. The collector of the transistor 246 is connected through a protecting diode 247 to a positive terminal 248 of an electric power source (not shown), while the emitter of the transistor 246 is connected to the base of a transistor 249. The collector of the transistor 249 is connected to the solenoid 104a, and the emitter thereof is grounded.

If the accelerator pedal is released to close the throttle valve when the vehicle is running in the third speed range gear ratio, the closed throttle switch 219 is closed so that the positive voltage is supplied to the junction 235 from which the voltage is supplied through the adjustable resistor 234 to the base of the transistor 230. When the vehicle is running at a speed below a predetermined level, the negative voltage indicative of the vehicle speed is so low that the voltage supplied to the junction 231 goes positive thereby rendering the transistor 230 conductive. With the transistor 230 energized, the voltage supplied to the junction 240 goes zero so that the transistor 239 is made non-conductive. Consequently, the voltage supplied from the terminal 236 connected to the electric power source (not shown) is supplied through the junction 243 to the base of the transistor 246 of the amplifier 214. Thus, the transistors 246 and 249 are made conductive to energize the coil of the first solenoid 104a. It should be noted, in this instance, that the hydraulic control circuit and accordingly the power transmission are operated to automatically effect downshift from the third to the second speed range gear reduction ratio according to the schedule set forth in Table III. When, however, the vehicle is running at a speed above the predetermined level, then the negative voltage indicative of the vehicle speed increases so that the voltage appearing at the junction 231 goes negative thereby rendering the transistor 230 non-conductive. This causes the transistor 239 to become conductive so that the voltage appearing at the junction 243 will be zero whereby the first solenoid 104a is de-energized. It should be kept in mind that it is possible to determine the shifting point at which the downshift will take place by varying the value of the adjusting resistor 234.

Figure 7:
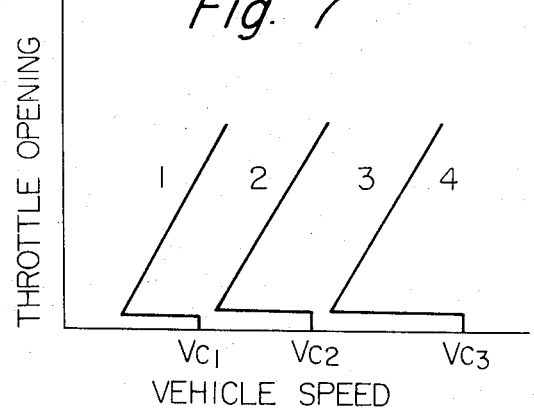
FIG. 7 is another example of shift patterns which are attained in accordance with this invention.
Figure 8:
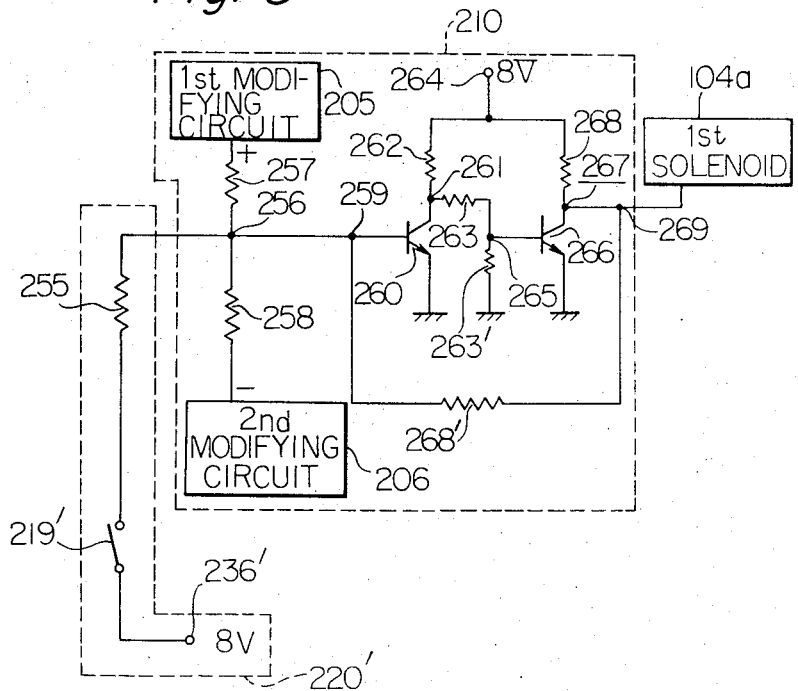
FIG. 8 is a diagram illustrating a modified form of the electric circuitry shown in FIG. 6.

Another example of the shift pattern is illustrated in FIG. 7, wherein numerals 1, 2, 3 and 4 indicate the first, second, third and fourth speed range gear reduction ratio shifting patterns, respectively. In FIG. 7, the respective speed levels at which downshifting takes place are shown as extended to respective higher speed levels, $V_{c1}$, $V_{c2}$ and $V_{c3}$, respectively, whereby the downshift may take place from the fourth to the third, from the third to the second and from the second to the first speed range gear reduction ratio so that engine braking may be effected when required. FIG. 3), FIG. 8 illustrates a modified form of the shift pattern generator 220 which is combined with the 2-3 speed range gear ratio comparator circuit 210. In this illustrated embodiment, the shift pattern generator 220' incorporates therein the closed throttle switch 219' which intervenes between a resistor 255 and a terminal 236' to which voltage is applied from a suitable electric power source. The resistor 255 is connected to a junction 256 between resistors 257 and 258. The resistor 157 is connected to the first modifying circuit 205 which in turn is connected to the throttle opening sensor 200 (see FIG. 3), while the resistor 258 is connected to the second modifying circuit 206 connected to the vehicle speed sensor 201. The voltage signal indicative of the throttle opening is supplied through the resistor 257 to the junction 256, to which the voltage signal indicative of the vehicle speed is also supplied through the resistor 258. The junction 256 is connected to junction 259, which in turn is connected to the base of transistor 260. The collector of the transistor 260 is connected to a junction 261 of resistors 262 and 263 and the emitter thereof is grounded. The resistor 262 is connected to a terminal 264, to which a voltage is supplied from a suitable electric power source. The resistor 263 is connected to a junction 265 which in turn is connected to the base of a transistor 266. The base of the transistor 266 is also grounded through a resistor 263'. The collector of the transistor 266 is connected to a junction 267 which in turn is connected through a resistor 268 to the terminal 264. The junction 267 is connected through a resistor 268' to the junction 259 and is also connected through a junction 269 to the first solenoid 104a.

When the accelerator pedal is depressed the closed throttle switch 219' is opened so that no signal is supplied to the junction 256 from the terminal 236' of the power source. However, the throttle signal and the vehicle speed signal are supplied to the junction 256 from the throttle opening sensor 200 and the vehicle speed sensor 201, respectively through the first and second modifying circuits 205 and 206, respectively. If, in this instance, the vehicle is running at a speed corresponding to the second speed gear ratio, then the amplitude of vehicle speed signal is lower than that of the throttle signal so that the voltage appearing at the junction 256 goes positive. Consequently, the transistor 260 is made conductive whereby the voltage appearing at the junction 261 and accordingly the voltage appearing at the junction 265 are zero. This causes the transistor 266 to become nonconductive and thus the voltage derived from the electric power source is supplied through the resistor 268 to the first solenoid 104a maintaining the same energized whereby the transmission continues to be in the second speed range gear ratio. In this condition, the resistor 268' functions to provide a hysteresis in the shift pattern. The voltage signal appearing at the junction 269 is fed through the resistor 268' back to the junction 256, whereby the downshift is effected in a normal manner, for example, as seen in FIG. 4.

When, however, the accelerator pedal is released when going downhill, then the closed throttle switch 219' is closed so that the closed throttle signal is further supplied to the junction 256 whereby the shift pattern is changed for the shifting to take place at a higher vehicle speed level. This is an important feature of the present invention. Since, in this instance, the hysteresis of the shift pattern is adapted to depend on the value of the resistor 268', the same hysteresis will be obtained as in the event that no closed throttle signal is supplied to the junction 256.

Figure 9:
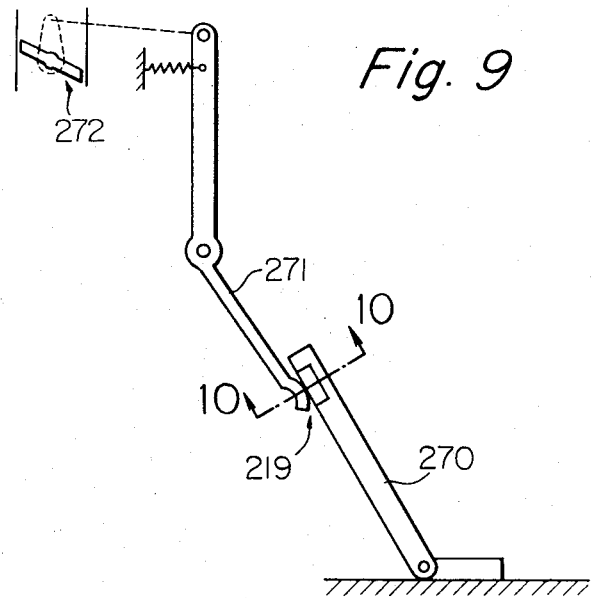
FIGS. 9 through 11 are views illustrating an example of the closed throttle switch shown in FIGS. 3, 6 and 8.
Figure 10:
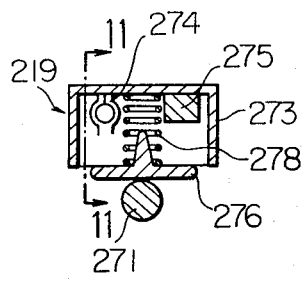
Figure 11:
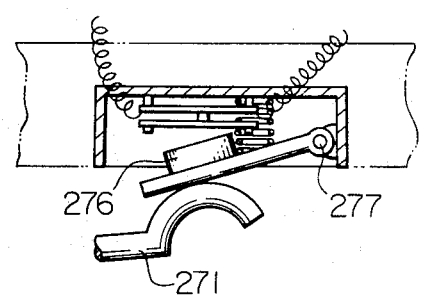

An example of the closed throttle switch is illustrated in FIGS. 9, 10 and 11 wherein like component parts are designated by same numerals. As shown in FIG. 9, the closed throttle switch 219 is actuated by an accelerator pedal 270 associated with a connecting lever 271 for actuating a throttle valve 272. The closed throttle switch 219 has a casing 273 which is mounted on the upper portion of the accelerator pedal 270. A reed switch 274 is secured to the inner wall of the casing 273. A magnet 275 is disposed adjacent to the reed switch 274 for selectively energizing the same. The closed throttle switch 219' also has a screen member 276 which is disposed between the reed switch 274 and the magnet 275 and is pivotally supported by a pin 277. A spring 278 is provided for urging the screen member 276 away from the magnet 275 thereby to cause the reed switch 274 to be closed by the action of the magnet 275. The screen member 276 is actuated by the connecting rod 271 controlled by the accelerator pedal 270.

When, in operation, the accelerator pedal 270 is depressed, the connecting rod 271 and accordingly the screen member 276 is moved in a position to effect screening action against the force of the magnet 275. Consequently, the reed switch 274 is opened. When, on the contrary, the accelerator pedal 270 is released, then the screen member 276 is moved away from the magnet 275 by the force of the spring 278. Accordingly, the reed switch 274 is magnetized by the action of the magnet 275 and, therefore, the reed switch 274 is closed.

From the foregoing, it will be seen that a control system according to this invention allows the power transmission to automatically effect forced downshift from a lower gear reduction ratio to a higher gear reduction ratio when an engine carburetor throttle valve is closed whereby engine braking action is successively effected.

What is claimed is:

1. An electronic control system for an automatic power transmission for a motor vehicle driven by an engine having a carburetor throttle valve controlled by an accelerator pedal comprising, in combination; gear ratio changing means, first sensing means for generating first voltage proportional in magnitude to vehicle speed; second sensing means for generating second voltage of opposite polarity to the first voltage and proportional in magnitude to effective open area of said carburetor throttle valve; circuit means connected with said gear ratio changing means for effecting the operation thereof including inputs connected to said first and second sensing means to receive said first and second voltages therefrom, and further including means for comparing the first and second voltages and producing a first set of shifting signals to cause said gear ratio changing means to effect shift into different gear ratios in accordance with a predetermined shift schedule in dependence on said first and second voltages; and control means including a constant voltage power supply means connected to said inputs of said circuit means to supply a third voltage of opposite polarity to said first voltage thereto and switching means connected between said constant voltage power supply means and said inputs of said circuit means, said switching means cooperating with said accelerator pedal for transmitting said third voltage to said inputs of said circuit means when said carburetor throttle valve is closed, and said comparing means producing a second set of shifting signals to cause said gear ratio changing means to effect shift into different gear ratios in accordance with another predetermined shift schedule in dependence on said first, second and third voltages, whereby downshift will take place at a higher vehicle speed level than normal when said throttle valve is closed.

2. An electronic control system according to claim 1, further comprising a resistor connected between said switching means and said inputs of said circuit means.

3. An electronic control system according to claim 1, in which said switching means includes a reed switch, a magnet for selectively energizing said switch, a screen member, a spring urging said screen member away from said magnet for de-energizing said switch, all of said elements being disposed in a housing formed in said accelerator pedal, a connecting rod linked with said throttle valve, and said connecting rod being arranged to act upon said screen member to open said reed switch in response to a depression of said accelerator pedal.

* * * * *